Patented July 22, 1952

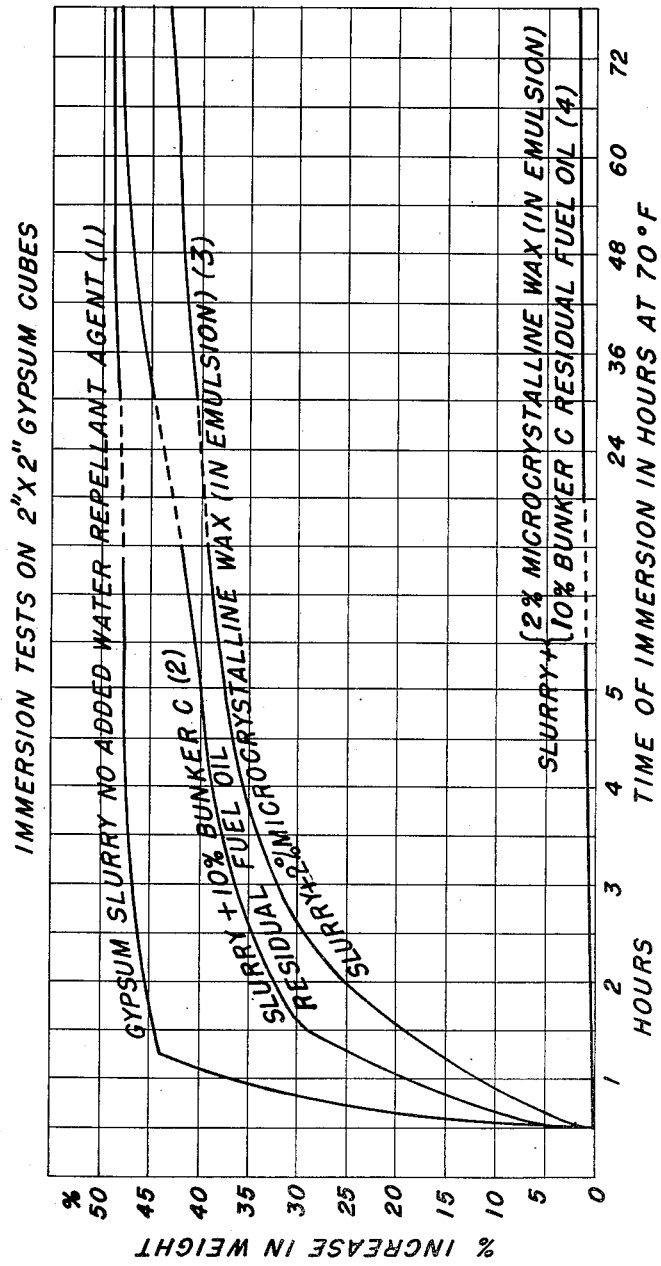
INVENTORS
WALLACE C. RIDDELL
GEORGE B. KIRK
BY James E. Toomey

2,604,411

UNITED STATES PATENT OFFICE 2,604,411

CEMENTITIOUS COMPOSITION

Wallace C. Riddell, Berkeley, and George B. Kirk, Redwood City, Calif., assignors to Henry J. Kaiser Company, a corporation of Nevada Application July 10, 1950, Serial No. 172,867

24 Claims. (Cl. 106—116)

This invention relates to the preparation of water-resistant, or water-repellant, cementitious products; and, especially, it relates to the production of water-resistant gypsum compositions, such as gypsum wallboard, gypsum tile and other gypsum products.

Earlier workers in this field have developed or proposed many methods for increasing the water-resistance or water-repellency of gypsum products, especially wallboard, which, for example, would enable use of the latter as sheathing material in the construction industry. Included in such methods have been processes wherein materials imparting water-resistance or water-repellency were incorporated in the gypsum slurry during the process of manufacture, as well as coating of the finished product with a water-proofing material. The disadvantage of the latter method is that any break in the surface will permit water penetration and absorption. The incorporation of water-repellency agents within the slurry is an advance in this art, but the processes heretofore employed have been rather expensive and, especially, have required expensive additives, and have sometimes necessitated either melting the agent or drying the treated slurry at an elevated temperature in order to effect proper diffusion of the treating agent and effective protection of the gypsum.

According to the present invention it has now been found that the disadvantages of earlier methods are overcome and a water-resistant gypsum product is obtained by incorporating in the gypsum material residual fuel oil or pine tar or coal tar and a water emulsion of a petroleum wax, prior to drying. From about 0.5% to about 2.0% of wax, calculated on the dry basis, is added, in the form of an emulsion in water. From 2.0% to 10.0% of the oil or tar is added, and preferably from 5.0% to 10.0% thereof. These percentages are based on the dry weight of the total unset gypsum composition; and the percentage of wax relates to the dry substance. Higher amounts can be added but tend to increase the cost of the process.

In this invention, the waxes employed, as water emulsions, advantageously include slack wax, which is an oily paraffin wax, dispersed in water by means of gum emulsifiers, and microcrystalline wax. Microcrystalline wax is preferred, which is also known in commerce as micro wax, amorphous wax, petroleum ceresine, petroleum ozokerite and the like. The microcrystalline, or, more simply, micro waxes include soft, medium and hard waxes, and the colors vary from nearly white to dark brown and black. The melting points thereof vary also and may be as high as 200° F. These waxes are distinguished from paraffin, and other, waxes by their crystalline characteristics and chemical structure. The micro waxes are not truly amorphous but tend toward illformed crystals and approach the amorphous state much more closely than do paraffin waxes. Whereas the paraffin waxes are generally believed to be straight chain hydrocarbons having, on the average, a 24 to 26 carbon atom chain, the micro waxes appear rather to be mainly high molecular weight branched chain hydrocarbons; and the micro waxes have much higher melting points, which is consistent with this structure. The average particle size of the micro wax is not over about one micron diameter. The micro waxes tend also to be resinous and sticky. The waxes are employed as aqueous emulsions which are available commercially. When the slack wax emulsion is employed, it is preferably added in an amount of from about 1.0% to 2.0% wax, on the dry basis; and where micro wax emulsion is employed, it is preferably added in an amount of from about 0.5% to 1.0% wax, on the dry basis.

The term "residual fuel oil" as employed in this specification and claims means the heavier residual fractions of petroleum, such as Bunker C oil, heavy fuel oil and equivalent heavy petroleum fractions; but it excludes the lighter fractions including gasoline, kerosene and diesel oils, on the one hand, and the solid residues of processing, including waxes and asphalt, on the other hand. One sort of residual fuel oil employed herein is a petroleum fraction which has a specific gravity of from 7.4 to 8.8, A. P. I. at 60° F.; and a flash point (closed cup) of from 205° F. to 212° F. It contains, upon analysis, approximately 85% carbon and 10% hydrogen, the remainder being water, sulfur, nitrogen, ash, etc. In place of, or in addition to, the residual fuel oil there can be employed also coal tar or pine tar. The total amount added of residual fuel oil, coal tar or pine tar, or any mixture of these components, is preferably from 5.0% to 10.0%, based on the total dry weight of the unset gypsum composition. Mixtures of residual fuel oil, coal tar and pine tar, or of any two of these materials, can be employed.

It is an advantage of this invention that a gypsum board, such as sheathing, or other gypsum product, so prepared is highly resistant to the action of water. It is a further advantage that the gypsum board or other product can be dried at atmospheric temperatures and that the step of drying at elevated temperatures can be avoided. This advantageous result may be effected by reason of the fact that the wax is of such small particle size and/or so well dispersed in the emulsion that, together with the liquid component, it is distributed over and deposits upon large surface areas and provides good coverage therefor as its water vehicle vaporizes off. A solid water-proofing agent, of larger crystal or particle size requires spreading by liquefaction, but the present invention avoids the necessity for fusing the waterproofing agent, or any component thereof. Whatever may be the true mechanism of this action, the effect is that the small amounts of the wax and the oil or tar employed according to the invention enable production of excellent water-repellency in the gypsum products concerned, and without the aid of heat in drying.

It is a particular advantage of the present invention that it enables the employment of a liquid agent which does not volatilize off in processing, and which does not require comminution or fusion. The oil or tar, as defined, being in the liquid state, is easily handled or poured and blends readily with the gypsum material at any stage of the process. For instance, it can be added to the gypsum prior to calcining, and will not volatilize off during that process; or it can be readily mixed into the slurry. The liquid agent co-acts with the wax in some manner to render the final gypsum product quite water-resistant, although, as shown in the annexed drawing, the wax alone, or the oil alone is quite ineffective, as will be further described below.

The wax employed and residual fuel oil, coal tar or pine tar can be admixed with the gypsum mass in various ways. The gypsum and the oil or tar can, if desired, be admixed and then the mixture subjected to calcination, for example, by heating to about 170° C. (or 340° F.). Alternatively, the oil can be mixed with the dry calcined gypsum by grinding these components together, or by mixing in a screw conveyor or other suitable mixing device; or the oil can be mixed with the slurry of calcined gypsum. The wax emulsion can be mixed with the dry calcined gypsum, or with the slurry of calcined gypsum, by any suitable means. The emulsion can alternatively be mixed with the water to be employed in forming the gypsum slurry, and the whole liquid then mixed with the calcined gypsum to form the slurry. In still another method of mixing, the wax emulsion and oil can be first mixed together and this mixture added to the water for slurrying, or to the calcined gypsum slurry and the whole thoroughly mixed. The admixture is, suitably, cast or otherwise formed into shape, and dried.

The attached drawing shows the advantageous results obtained by the present invention, and in this figure the changes in water-absorption with respect to time of immersion in water, for test samples of gypsum, as will be described, are shown graphically. These values were obtained by tests carried out in the following manner. To four portions of a calcined gypsum slurry are added the agents shown in the amounts stated: (1) no added agent; (2) 10% residual fuel oil, based on the dry weight of calcined gypsum; (3) 2% of a 50% emulsion of microcrystalline wax in water, the added amount being calculated on the amount of dry wax with respect to the dry weight of calcined gypsum; (4) 10% residual fuel oil and 2% of a 50% emulsion of microcrystalline wax in water, and in this test the oil and emulsion are each added directly to the gypsum slurry and thoroughly admixed. Two-inch cubes are cast from these slurries and are dried. They are then tested for water absorption by immersing in water of such depth that a one-inch head is maintained above the pieces, at a temperature of 70° F., for times as shown on the graph. At the end of the respective periods of immersion, test cubes are examined to determine the amount of water absorbed, and these values, up to 72 hours, are plotted to give the curves shown in the figure. The untreated gypsum (graph 1) absorbs water very rapidly. The gypsum treated with the oil alone (graph 2) and that treated with microcrystalline wax alone (graph 3) also absorb water quite rapidly, although somewhat less rapidly than the untreated material. However, when both the oil and wax emulsion are added the decrease in water absorption (graph 4) is very pronounced and satisfactory, and is more than would be expected from the results obtained with either agent alone.

The petroleum wax-water emulsions useful in this invention are commercially available and comprise up to over 50% of the wax emulsified in water, a small amount (up to about 3.5%) of an emulsifying agent preferably being employed to effect emulsification. The emulsifying agent employed can be a protein, such as casein, or sulfonated oil, sulfonated or sulfated alcohol or carboxylic acid, starch, clay, gums, or other desired agent. Varying amounts of wax can be present in the emulsions available but for economic reasons as high an amount of wax as possible is desirable; but commercially available emulsions containing about 50% of wax are useful. It is an advantage that, by employing an emulsion of the wax in water, rapid and thorough dispersion in the calcined gypsum slurry is easily effected; and a further advantage is that there is no problem of driving off or recovering a solvent for the wax.

It is an advantage of the present invention that the water-repellency additives are effective without the necessity for drying the gypsum products at higher temperatures. This enables production of water-repellent blocks of gypsum, or of structural elements, such as roofs or floors, which are cast and dried at the site of use, under circumstances where the employment of elevated drying temperatures is not economically possible.

The examples given below will more clearly illustrate the mode of carrying out the invention.

*Example I*

To a plastic gypsum slurry in water, containing 1000 grams of calcined gypsum, are added 5% of residual fuel oil (Bunker C) and 1% of microcrystalline wax. (These percentages are based on the dry weight of the calcined gypsum and the amount of wax refers to the amount of dry wax.) The wax is added in the form of an emulsion in water. The whole is thoroughly admixed and then cast into 2" x 4" cylinders, and the cylinders are dried at room temperature. By the immersion test described above, there is a gain in weight, or moisture absorption, of 2.7% after 30 minutes. In a test carried out in exactly the same way except that 10% of the oil is added, there is a gain in weight of 2.6% after 3 hours' immersion. In still another series of tests carried out in the same way except that there are added 0.5% of the microcrystalline wax (as above, in the form of the water emulsion) and 10% of the oil; and in this series the test cubes show a water absorption of 2.3% after 3 hours' immersion. In contrast thereto, control test cubes containing no additives show a water absorption of about 40% after 30 minutes' immersion and about 45% after 3 hours' immersion.

*Example II*

With a calcined gypsum slurry is thoroughly admixed 1% of microcrystalline wax, based on the weight of dry solids in the slurry, the wax being added in the form of a 50% emulsion thereof in water, and there is also added, with thorough mixing, 10% of residual fuel oil. The slurry is formed into sheathing board and most of the production is dried at elevated temperature. The dryer air temperatures may exceed 350° F., however, the core temperatures probably do not exceed 230° F. Several of these boards are removed from the production line before entering the drier, and are dried in air and at room temperature (60° F. to 70° F.) and are then subjected to the immersion test. 2" x 4" sections with all edges freshly cut show a water absorption of only 2.7% after 30 minutes' immersion. Immersion tests, as described above, carried out upon ½" x 12" x 16" sections with all edges freshly cut show a water absorption of only 3.8% after 5 hours' immersion; 12" x 12" sections cut in the same manner show 3.5% absorption after 5 hours' immersion; and 6" x 6" sections absorbed only 2.8% water after 30 minutes' absorption. In contrast thereto, in testing gypsum sheathing board made in the same manner but without water-repellent additives, ½" x 12" x 16" test pieces show a water absorption of 52% after 5 hours' immersion.

*Example III*

To a plastic slurry of calcined gypsum is added, with intimate mixing, 1% microcrystalline wax, in the manner described in Example I, and 10% coal tar is also added with thorough mixing. The slurry is cast in two-inch cubes and the cubes are dried at room temperature and subjected to the immersion test, exhibiting a gain in weight of only 3.4% after 30 minutes' immersion. Other cubes are made of another sample of this same gypsum slurry, and in the same manner, except that 10% of pine tar is admixed instead of the 10% of coal tar. After similar drying these cubes are subjected to the immersion test and exhibit a gain in weight of only 3.5% after one hour's immersion.

The microcrystalline wax employed in Examples I, II, and III, is in the form of an emulsion in water, containing 50% by weight of solids and 2% to 3%, by weight, casein as empulsifier; the emulsion having a specific gravity of 8 pounds per gallon, a pH of from 6 to 7, and a wax particle size of from 0.5 to 1.5 microns diameter.

In preparing gypsum products according to this invention it is believed that the microcrystalline waxes act, with the residual fuel oil or the tars disclosed, to produce the excellent water-repellent characteristics by reason of the extremely fine particle size of these waves and the thorough dispersion over the gypsum surfaces which is attainable thereby. The micro wax may, so to speak, occlude the oil or the coal tar or pine tar, with the result that the liquid agent clings more firmly to the surfaces of the gypsum material and is better distributed thereover. High melting point waxes of this type, for example, those having melting points of about 196° F., as well as those having a lower melting point, for example, from about 122° F. to about 165° F., are useful in invention.

*Example IV*

With a plastic slurry of calcined gypsum are thoroughly admixed, in the primary mixer, 1% of slack wax having a melting point of 135° F., in the form of a 50% emulsion in water, emulsified with about 3.5% gum emulsifier, and 6% of Bunker C oil. The slurry is formed into sheathing board in the usual manner, the board having gypsum core material disposed within fibrous liners; and the boards are dried at elevated temperature. The immersion test, as previously described, run on ½" x 6" x 6" sample sections, showed 9.1% water absorption after 30 minutes' immersion. In still another test, gypsum board is made in this same manner but with the addition of 2% of the slack wax (in emulsion) and 10% of the oil, and is then dried at room temperature (60°-70° F.) and the water absorption after 30 minutes' immersion is only 2.4%.

In a variation, a portion of the petroleum wax can be substituted for, or replaced by, rosin in the form of a water emulsion, such as is disclosed and claimed in the process set forth in our copending application, Ser. No. 172,868, filed July 10, 1950. That is to say, with an amount of the petroleum wax emulsion of the present invention there is also admixed with the gypsum material, in the same manner, a rosin emulsion. The total amount of solid additives employed is from 0.5% to 2.0% by weight, on the dry basis. Where a preponderant amount of rosin is employed, residual fuel oil is employed. It is particularly advantageous to employ a solid water-repellency agent or constituent comprising rosin and microcrystalline wax, these components being added in the form of water emulsions, or as a single water emulsion.

In this specification and claims, percentages shown are by weight, unless otherwise indicated. In general it is advantageous to employ higher percentages of the oil or tar described when the lower amounts of a wax, within the preferred range for the wax, is employed. While the employment of higher drying temperatures is advantageous for the purpose of accelerating the drying of the gypsum products, such temperatures are not required in order to obtain the water-repellent effect of the compounds employed herein; and where speed of drying is not desired, or is not practicable, drying at air or room temperature is useful. It is to be understood that the usual modifying additives can be, and are, admixed in the calcined gypsum slurries where desired, as in making wallboard, for example.

The above examples and specific description have been given for purposes of illustration only and it is to be understood that modifications and variations can be made therein without departing from the spirit and scope of the appended claims.

Having now described the invention what is claimed is:

1. In a process for producing a water repellant gypsum product the step which comprises intimately admixing a water slurry of calcined gypsum, from 0.5% to 2.0%, based on the dry weight, of petroleum wax in the form of a water emulsion, and from 2% to 10%, based on the dry weight, of at least one substance chosen from the group consisting of residual fuel oil, pine tar and coal tar.

2. Process as in claim 1 wherein the petroleum wax is slack wax and is in the form of a water emulsion containing a small amount of gum emulsifier.

3. Process as in claim 1 wherein the petroleum wax is microcrystalline wax.

4. Process as in claim 1 wherein a portion of said petroleum wax emulsion is replaced by rosin emulsion.

5. Process for producing a water repellent gypsum product which comprises intimately admixing a water slurry of calcined gypsum, from 0.5% to 2.0%, based on the dry weight, of petroleum wax in the form of a water emulsion and from 5.0% to 10.0%, based on the dry weight, of at least one substance chosen from the group consisting of residual fuel oil, pine tar and coal tar, forming into shape, and drying at room temperature.

6. Process of preparing a water repellent gypsum product which comprises intimately admixing a calcined gypsum slurry, from 0.5% to 1.0%, based on the dry weight, of microcrystalline wax in the form of a water emulsion, and from 5% to 10% of at least one substance chosen from the group consisting of residual fuel oil, coal tar and pine tar, casting said admixture into shape, and drying.

7. Process as in claim 6 wherein from 5% to 10% of residual fuel oil is admixed.

8. Process as in claim 6 wherein said admixture is dried at room temperature.

9. Process as in claim 6 wherein said water emulsion contains a small amount of a protein emulsifying agent.

10. Process for producing water repellent gypsum board which comprises intimately admixing a calcined gypsum slurry and from 0.5% to 2.0%, based on the dry weight, of petroleum wax in the form of a water emulsion and from 5% to 10% of at least one substance chosen from the group consisting of residual fuel oil, coal tar and pine tar, casting boards of said admixture, and drying said board.

11. Process for producing a water repellent gypsum product which comprises intimately admixing gypsum and at least one substance chosen from the group consisting of residual fuel oil, coal tar and pine tar, calcining said admixture, forming a water slurry thereof, intimately admixing with said water slurry from 0.5% to 2.0%, based on the dry weight, of a petroleum wax in the form of a water emulsion, and drying said admixture, said substance chosen from the group consisting of residual fuel oil, coal tar and pine tar being added in an amount of from 2% to 10% based on the total dry weight.

12. Process for producing a water-repellent gypsum product which comprises intimately admixing a calcined gypsum slurry, from 0.5% to 2%, based on the dry weight, of a solid water-repellency agent comprising microcrystalline wax and rosin, in the form of water emulsions thereof, and from 5% to 10% of residual fuel oil, forming and drying.

13. A water-repellent gypsum product comprising a set mass of gypsum crystals protectively coated by from 0.5% to 2.0% of uniformly dispersed petroleum wax and from 2% to 10% of at least one substance chosen from the group consisting of residual fuel oil, coal tar and pine tar.

14. A water-repellent gypsum product comprising a set mass of gypsum crystals protectively coated by from 0.5% to 1.0% of uniformly dispersed microcrystalline wax and from 5% to 10% of at least one substance chosen from the group consisting of residual fuel oil, coal tar and pine tar.

15. Product as in claim 14 having dispersed therein from 5% to 10% by weight of residual fuel oil.

16. Product as in claim 14 having dispersed therein from 5% to 10% by weight of pine tar.

17. Product as in claim 14 having dispersed therein from 5% to 10% by weight of coal tar.

18. A water-repellent gypsum product comprising a set mass of gypsum crystals protectively coated by from 1% to 2% of uniformly dispersed slack wax and from 5% to 10% of at least one substance chosen from the group consisting of residual fuel oil, coal tar and pine tar.

19. Product as in claim 18 having dispersed therein from 5% to 10% by weight of residual fuel oil.

20. Product as in claim 18 having dispersed therein from 5% to 10% by weight of pine tar.

21. Product as in claim 18 having dispersed therein from 5% to 10% by weight of coal tar.

22. Water-repellent gypsum board wherein the gypsum core material comprises a set mass of gypsum crystals protectively coated with from 0.5% to 1.0% by weight of uniformly dispersed microcrystalline wax and with from 5% to 10% by weight of at least one substance chosen from the group consisting of residual fuel oil, coal tar and pine tar.

23. Water-repellent gypsum product comprising a set mass of gypsum crystals protectively coated with from 0.5% to 2.0% of uniformly dispersed solid water-repellency agent comprising rosin and microcrystalline wax and with from 2% to 10% of residual fuel oil.

24. In the process of producing a water-repellent gypsum product, the step which comprises preparing a water slurry containing calcined gypsum, from 2% to 10%, based on the total dry weight, of at least one substance chosen from the group consisting of residual fuel oil, coal tar and pine tar, and from 0.5% to 2.0%, based on the total dry weight, of petroleum wax in the form of a water emulsion.

WALLACE C. RIDDELL.
GEORGE B. KIRK.

REFERENCES CITED

The following references are of record in the file of this patent:

UNITED STATES PATENTS

| Number | Name | Date |
| --- | --- | --- |
| 1,287,453 | Sanderson | Dec. 10, 1918 |
| 2,432,963 | Camp | Dec. 16, 1947 |
| 2,460,267 | Haddon | Feb. 1, 1949 |
| 2,526,537 | Camp | Oct. 17, 1950 |
| 2,526,538 | Camp | Oct. 17, 1950 |